UNITED STATES PATENT OFFICE.

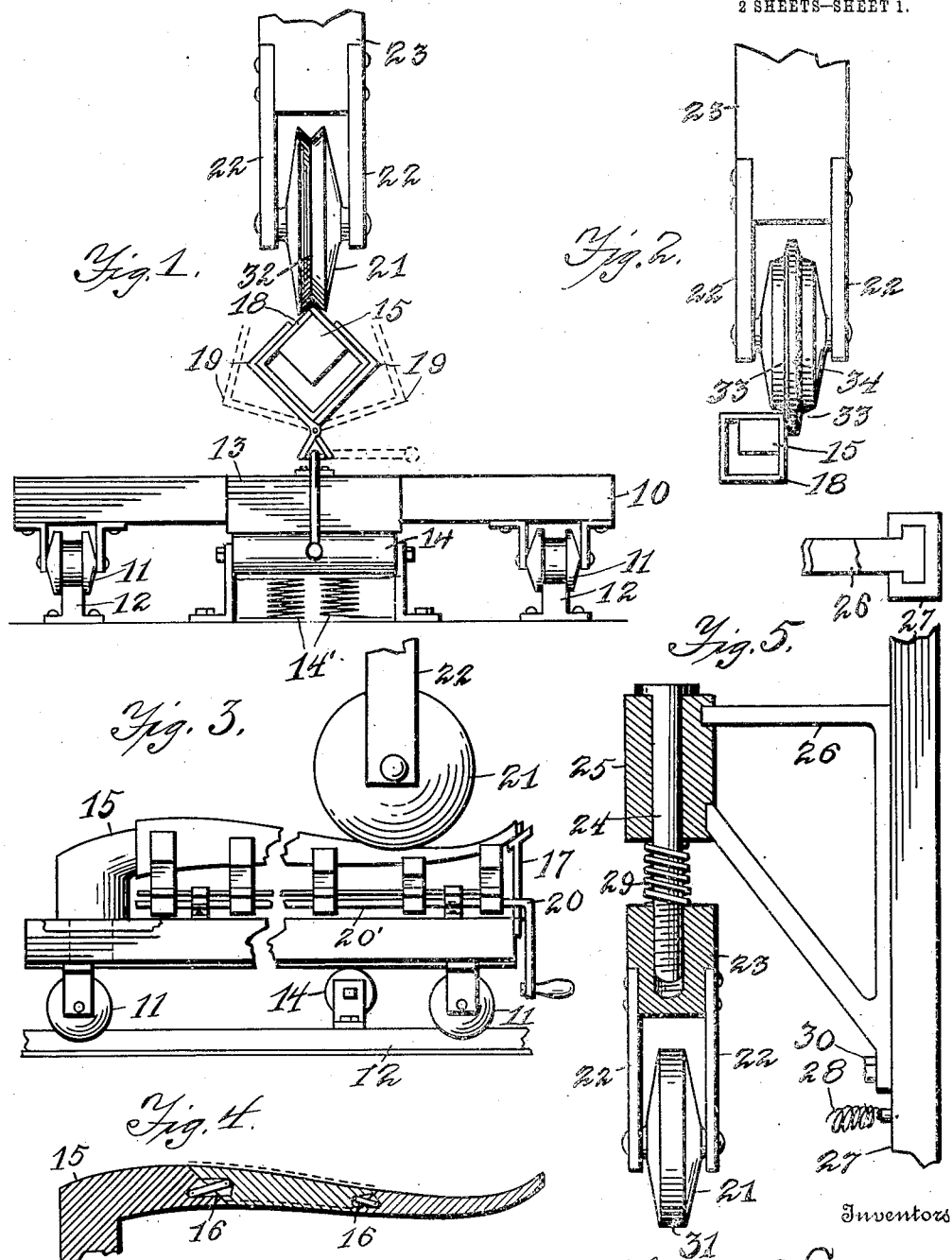

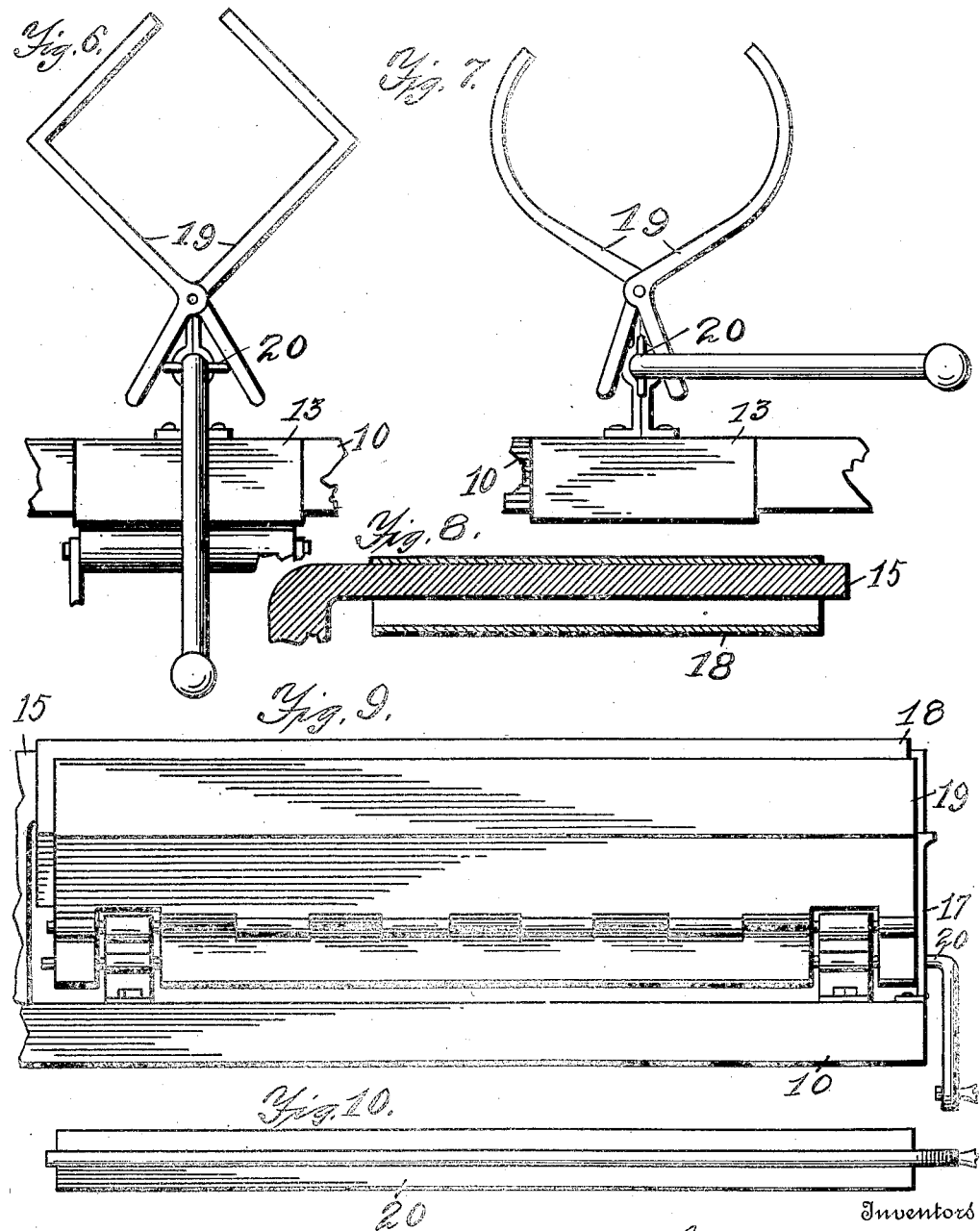

CHARLES A. LINDEN AND CARL ALVIN CARLSON, OF JAMESTOWN, NEW YORK.

ELECTRIC WELDING-MACHINE.

1,052,491.  Specification of Letters Patent.  Patented Feb. 11, 1913.

Application filed March 19, 1912. Serial No. 684,689.

*To all whom it may concern:*

Be it known that we, CHARLES A. LINDEN and CARL ALVIN CARLSON, citizens of the United States, residing at Jamestown, in the county of Chautauqua and State of New York, have invented certain new and useful Improvements in Electric Welding-Machines, of which the following, taken in connection with the accompanying drawings, is a specification.

The invention relates to machines for welding by electricity and the object of our invention is to provide a simple and convenient machine by means of which the electric current may be passed through the parts to be welded, whether said parts are square tubular or flat, attaining a continuous pressure upon said parts and at the same time permitting the parts to be welded to be passed beneath a wheel electrode formed to conform to the shape of parts; and the invention consists in the construction and combination of the parts as shown in this specification and the accompanying drawings and pointed out in the claims.

In the drawings, Figure 1 is an elevation of a grooved wheel electrode in position upon a square corner of a tube to weld the same, the parts being held in place by means of a clamp mounted upon a movable table or carriage. Fig. 2 is an elevation of a modification of the grooved wheel electrode as applied to the corner of a square tube. Fig. 3 is an elevation, partly in section, of the movable table and tubular leg of a table or chair with the wheel electrode in position thereon; and Fig. 4 is an elevation of the jointed mandrel for said leg. Fig. 5 shows end and side elevations of the adjustable spring frame for supporting the wheel electrode. Fig. 6 is an endwise view of a clamp having square jaws for holding a tubular piece for welding with the jaws in the closed position; and Fig. 7 is a similar view of a clamp having curved jaws for round tubing and shown in the open position. Fig. 8 is a lengthwise sectional view of a straight mandrel for welding straight tubing and showing a piece of tubing thereon in section. Fig. 9 is a sidewise elevation of the clamp with a piece of square tubing therein. Fig. 10 is a lengthwise plan view of the crank and winged shaft for opening and closing the jaws of the clamp.

Like numerals of reference designate similar parts in the several views.

The numeral 10 designates a movable table or carriage which is mounted on the wheels 11 on the rails 12. The wheels 11 preferably have a square annular groove and fit over the top of the rails 12 so as to hold the table 10 firmly in line as it moves back and forth. The table top 10 has a plate 13 set therein and extending beneath the rest of the table top and lengthwise of the same. The plate 13 is preferably of copper and forms the under pole for the electrical contact. A roller 14 is provided beneath the plate 13 and contacts the same, thereby forming an electrical roller contact. A transformer 14' is provided immediately beneath the roller 14 through which transformer the electrical connection is made from one of the terminals of the transformer 14'.

For tubular work, a mandrel or core 15 is provided which may be straight for straight tubing, as shown in Fig. 8, or curved and tapered for tubular legs of furniture, as shown in Figs. 3 and 4, and for this latter purpose is preferably made with joints 16 which permit of the upward movement of the parts of the mandrel 15 to adapt itself to the curved tubular sheet metal leg in slipping the same onto the mandrel. The joints 16 are so formed that the mandrel assumes the proper shape for the tubular leg or other article and it will be rigid when pressed down so as to hold against the pressure upon the same in the operation of welding. A hinged support 17 may be provided for the outer end of the mandrel which support is turned into place to uphold said outer end after the tube 18 is slipped onto the mandrel.

The clamp to hold the sides of the tube 18 together at the joint consists of the hinged jaws 19 which are operated by means of a crank and winged shaft 20 which actuates said jaws to press upon the sides of the tube and press the joint firmly together. This is attained by wing shaft 20 so that when the crank is turned in one direction said jaws 19 will be clamped firmly against the sides of the tube throughout their length and when turned in the opposite direction the jaws will be instantly released, as shown in dotted line in Fig. 1.

A wheel electrode or upper pole 21 is revolubly supported in suitable depending side bars 22 from a solid bar 23. The bar 23 is pivotally supported upon a pin 24 which pin is supported upon a second block 25 which is in turn supported upon a bracket 26, which bracket is slidably mounted within the channel bar 27. The channel bar 27 has suitable electric connection 28 to one of the terminals of the transformer 14'. A spring 29 is provided on pin 24 between bars 23 and 25 to hold a resilient pressure upon the wheel 21 and cause it to bear constantly upon the surface to be welded adapting itself automatically to the inequalities in said surface, as, for example, in the curves of a grooved leg, as shown in Fig. 3. The bracket 26 is slidably mounted within the channel bar 27 and supported therein by means of a suitable set screw 30 so that said bracket and the depending electrode 21 may be moved up or down and adjusted as desired in relation to the work.

For welding flat surfaces, as, for example, the flat edges of two pieces of sheet metal, the edges of the metal are firmly held against one another upon the pole plate 13. A flat edge electrode is used, as shown at 31 in Fig. 5. It is apparent that the flat plates may be held firmly throughout their entire length so that they cannot buckle or change on account of the welding heat and that the table can be run through underneath the wheel electrode 21, said wheel electrode having been adjusted to the correct contact upon the plates to be welded, and that a continuous welding heat may be electrically attained at the point of contact between the two electrodes.

For welding a square corner of tubing or other article, a V-shaped grooved wheel electrode is preferred, as shown at 32 in Fig. 1, which fits over both sides of the square corner. A modified form of the V-shaped grooved wheel is shown in Fig. 2 in which a groove 33 is provided on each side of the wheel 21 as in the form of a rabbet, leaving a tongue 34 between the two grooves. The groove 33 fits onto the square corner of a box or article of furniture and would serve a good purpose in many kinds of construction. For most uses, however, the V-shaped groove 32 is preferred.

The bracket 26 and parts 23, 24 and 25 are made sufficiently heavy to carry the full current of electricity generated. The connecting bars 22 between the wheel 21 and the block 22 are of less capacity though sufficiently strong for any purpose to which the wheel 21 might be applied, but being of less capacity in their carrying power for the electrical current, they will be burned off before any of the other parts are injured should there be an overcharge of electricity.

We claim as new—

1. In an electric welding machine, a revoluble wheel electrode and a vertically pivoted support for said wheel electrode, a pin connecting said wheel and said pivoted support, a spring on said pin to resiliently support said wheel electrode, a bracket for supporting said pivoted support, said bracket vertically adjustable, a carriage to support the parts to be welded, said carriage movably mounted beneath said wheel electrode, and suitable electric connection to said wheel electrode and said carriage, substantially as and for the purpose specified.

2. In an electric welding machine, an upper electrode and suitable connection thereto, an under electrode comprising a table having a plate set therein, supporting rails beneath said table and grooved wheels revolubly mounted on the under side of said table to fit upon said rails and hold said table in line, electric connection to said plate on said table, and a clamp on said plate to hold the parts to be welded.

3. In an electric welding machine an upper electrode and electric connection to the same, an under electrode comprising a carriage and suitable rails for said carriage to move thereon beneath said upper electrode, a mandrel on said carriage and electric connection to said mandrel, a clamp comprising oppositely placed pivotally supported jaws having oppositely placed downward extensions thereon, a winged shaft between said downward extensions to spread the same and operate said clamp to hold the work, and a crank on said winged shaft to turn the same, substantially as and for the purpose specified.

4. In an electric welding machine, a revoluble wheel electrode, a mandrel beneath said electrode having lengthwise curves, and joints in said mandrel to permit adjustment to the work.

5. In an electric welding machine, a revolubly mounted wheel electrode, a mandrel beneath said electrode, and joints in said mandrel permitting downward pressure.

In testimony whereof we have affixed our signatures in the presence of two witnesses.

CHARLES A. LINDEN.
CARL ALVIN CARLSON.

Witnesses:
H. U. HARRIS,
A. W. KETTLE.